Figure 1:
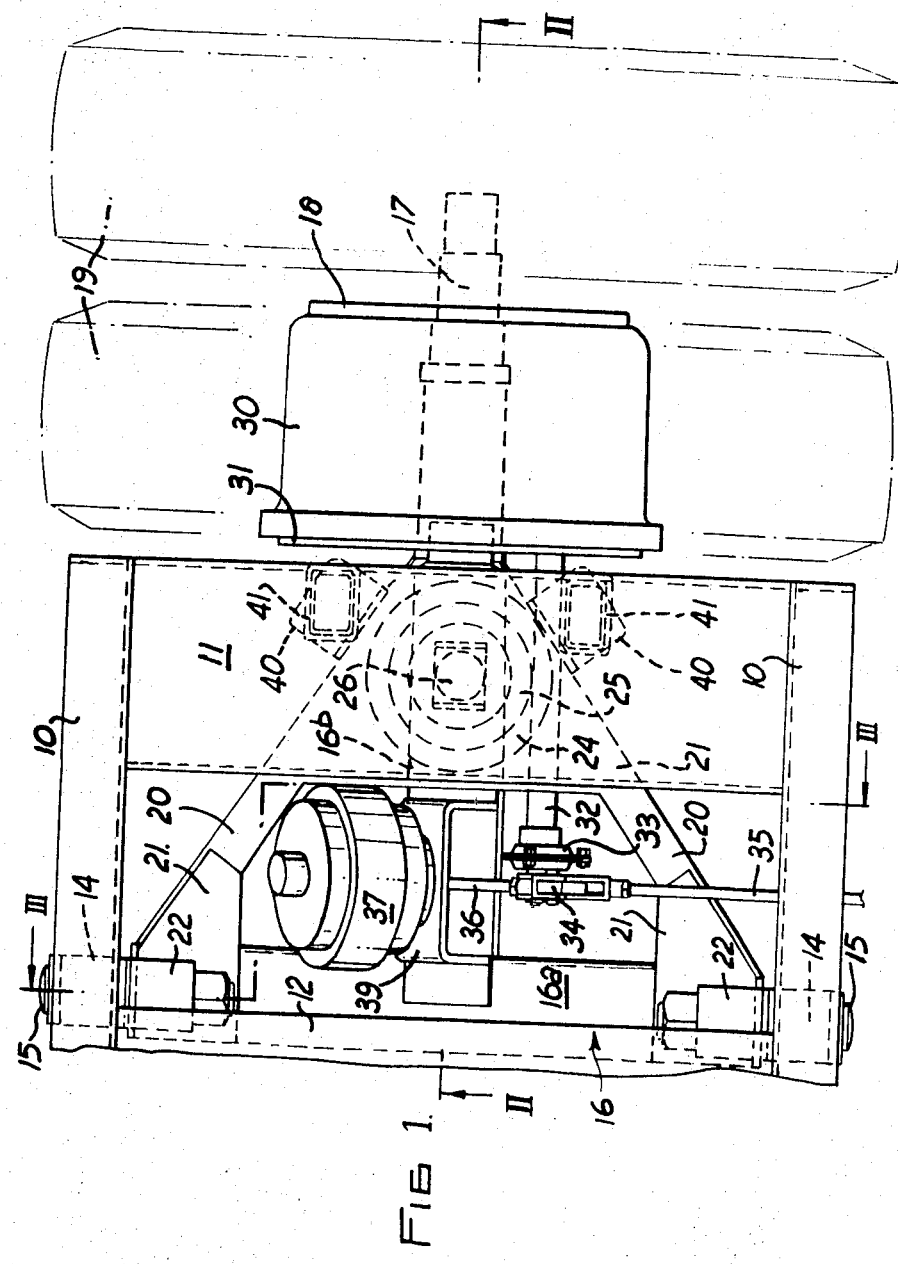

United States Patent

[11] 3,591,199

| [72] | Inventor | William T. Bowden<br>Marple, England |
|------|----------|--------------------------------------|
| [21] | Appl. No. | 851,220 |
| [22] | Filed | Aug. 19, 1969 |
| [45] | Patented | July 6, 1971 |
| [73] | Assignee | Peak Trailers Limited |
| [32] | Priority | Aug. 21, 1968 |
| [33] | | Great Britain |
| [31] | | 39952/68 |

[54] TRAILER VEHICLES
7 Claims, 6 Drawing Figs.

| [52] | U.S. Cl. | 280/124 |
|------|----------|---------|
| [51] | Int. Cl. | B60g 9/02 |
| [50] | Field of Search | 280/124, 124.1; 267/20 |

[56] References Cited
UNITED STATES PATENTS

| 2,968,357 | 1/1961 | Roller | 280/124 (X) |
| 3,180,653 | 4/1965 | Passman | 280/124 (X) |

*Primary Examiner*—Milton Buchler
*Assistant Examiner*—Carl A. Rutledge
*Attorneys*—Harry C. Bierman, Jordan B. Bierman and Bierman and Bierman ABSTRACT: A self-contained suspension system for a trailer vehicle whose front end is adapted for swivellable mounting upon a tractor vehicle, such system comprising an underframe for attachment to the trailer chassis with its major dimension transverse thereto, two wheel-carrying arms with stub axles fixed in corresponding ends thereof and their other ends provided with braced T-heads which are pivoted to said underframe about parallel axes at opposite sides of its midpoint, and coil springs interposed between the outer ends of said arms and adjacent parts of said underframe so that the wheels carried by said arms are sprung independently one of the other.

INVENTOR:
WILLIAM TURNER BOWDEN

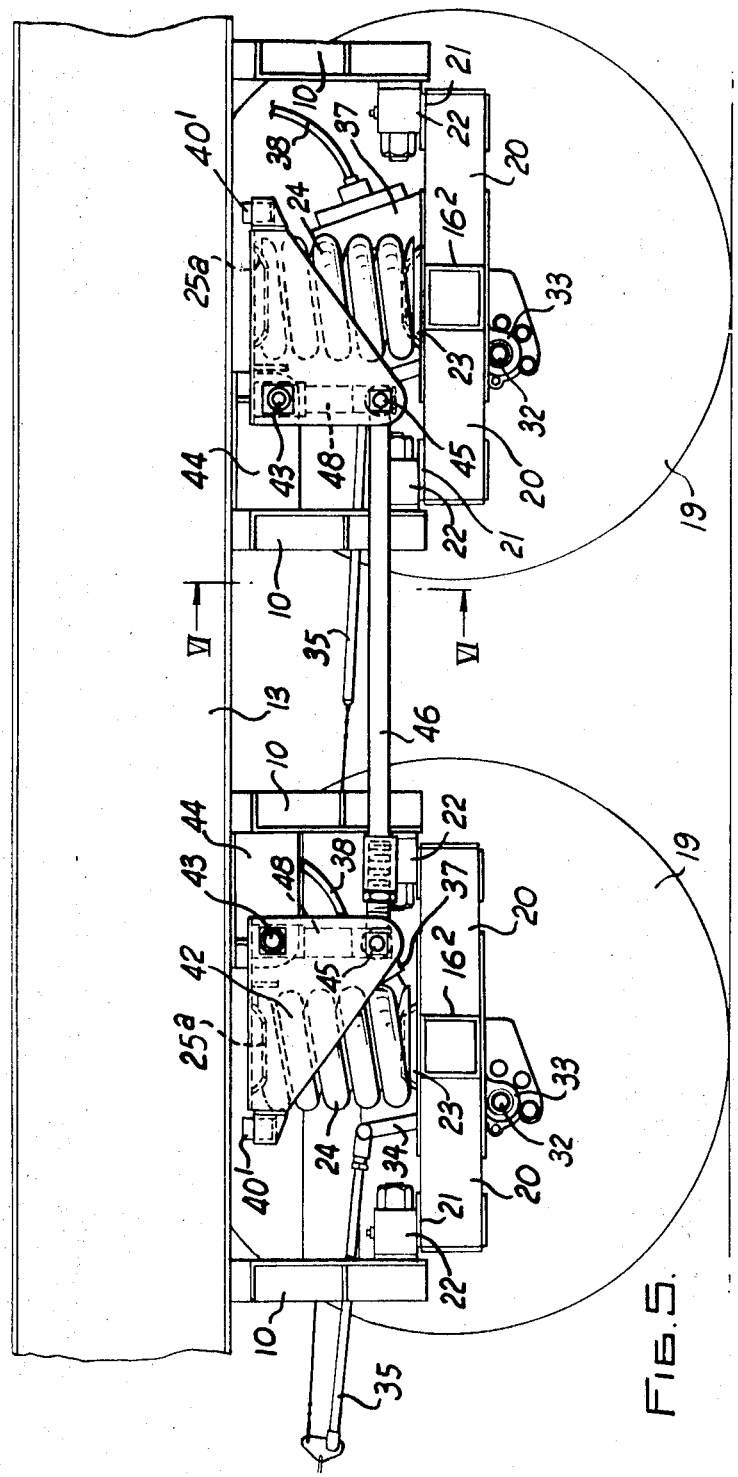

TRAILER VEHICLES

This invention relates to trailer vehicles, of the type (commonly known as "semitrailers") having a chassis adapted at its front end for swivellable mounting upon a tractor vehicle and having its rearward part supported, by resilient suspension means, upon at least one pair of laterally spaced road wheels. The term 'road wheel' in this context should be understood to include twin wheels secured to a common hub.

In commercial vehicles of the type referred to, which are designed to carry up to 10 tons per pair of wheels, the chassis normally comprises two main longitudinals connected by crossmembers which project outwardly thereof to support the body and which, in the case of trailers having a fixed platform or other body, may be connected at their extremities by further longitudinal members of lighter cross section than the inner ones. In this country at least, the/or each pair of road wheels have invariably been mounted at opposite ends of a dead axle fixed to half-elliptic leaf springs whose extremities are connected directly or indirectly to suitable chassis members.

The object of the present invention is to improve the riding and road-holding qualities of trailers of the type referred to.

According to this invention we provide an underframe for attachment to the chassis of such a trailer with its major dimension transverse thereto, two wheel-carrying arms with stub axles fixed in corresponding end thereof and their other ends provided with braced T-heads which are pivoted to said underframe about parallel axes at opposite sides of its midpoint, and coil springs interposed between the outer ends of said arms and adjacent parts of said underframe, the assembly thus providing a self-contained suspension system whereby the wheels are sprung independently one of the other.

An hydraulic damper may be arranged concentric with each coil spring to connect the parts of the arm and underframe separated by the latter, and each pivoted arm or "wishbone" may carry an air-operated actuator for braking means associated with a wheel hub on the adjacent stub axle.

Two or more such suspension systems may be attached side by side to the trailer chassis in place of the leaf springs used in a conventional tandem or triaxle layout, suitable mechanical or fluid-pressure compensation being provided between the several arms on each side of the vehicle's centerline.

Figure 2:
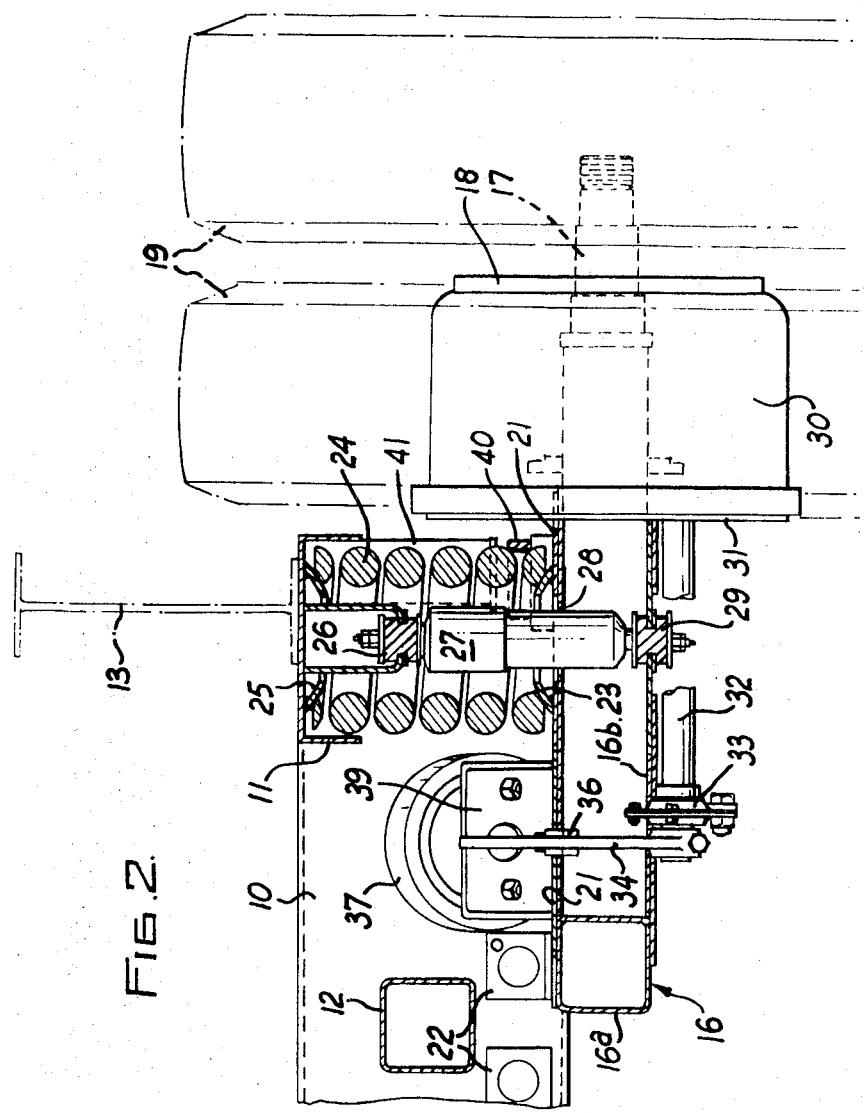
Figure 3:
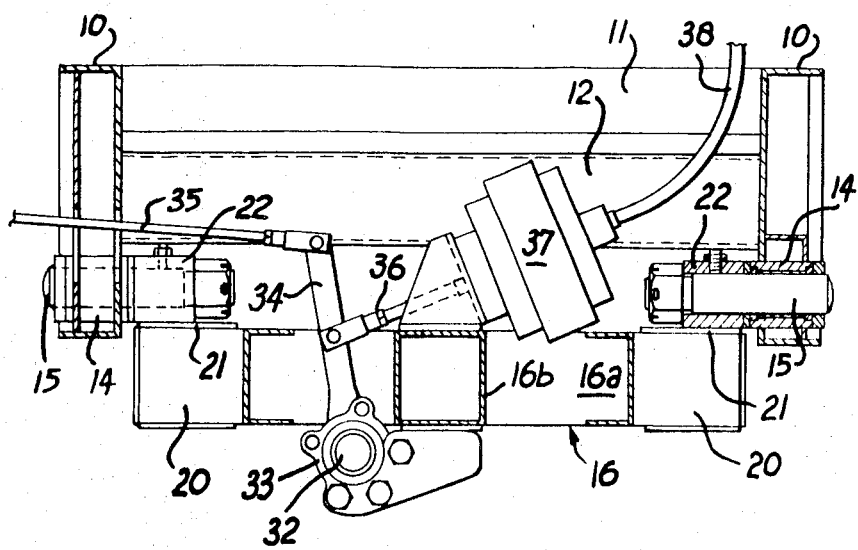
Figure 4:
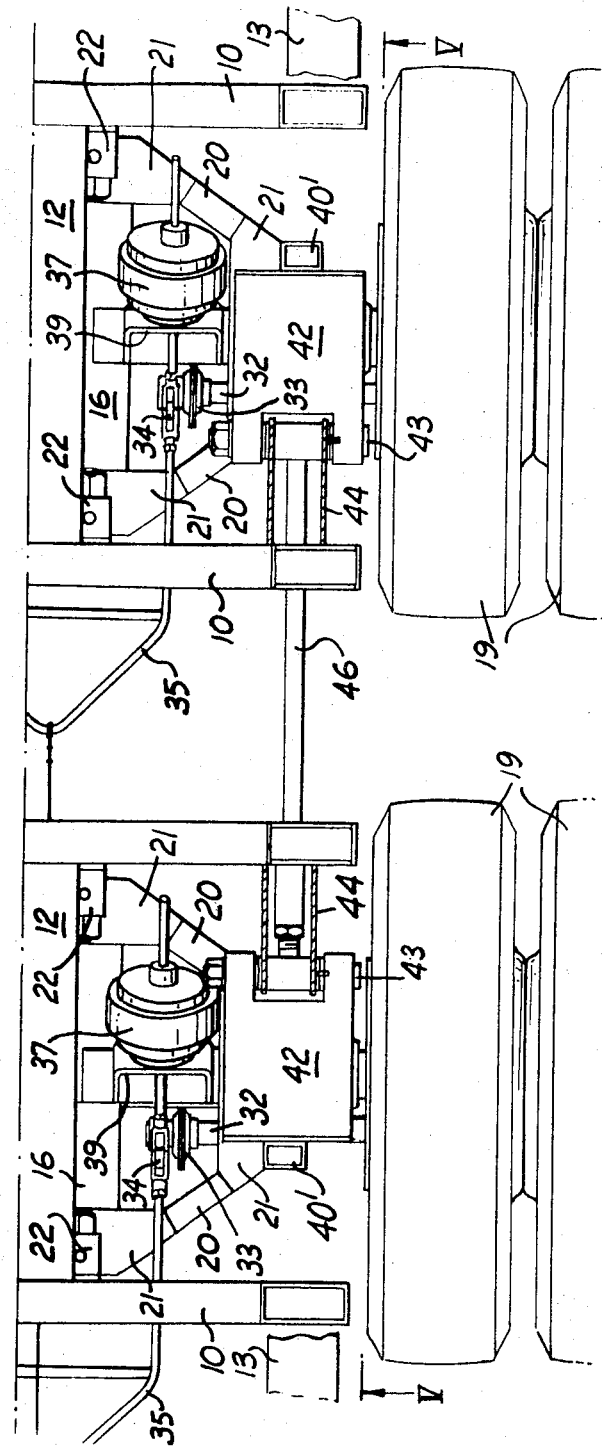

In the accompanying drawings:

FIG. 1 is a fragmentary plan view of a trailer suspension system embodying the present invention;

FIGS. 2 and 3 are sections on the lines 2-2 and 3-3, respectively, of FIG. 1;

FIG. 4 is a view corresponding to FIG. 1 but showing a tandem system; and

Figure 6:
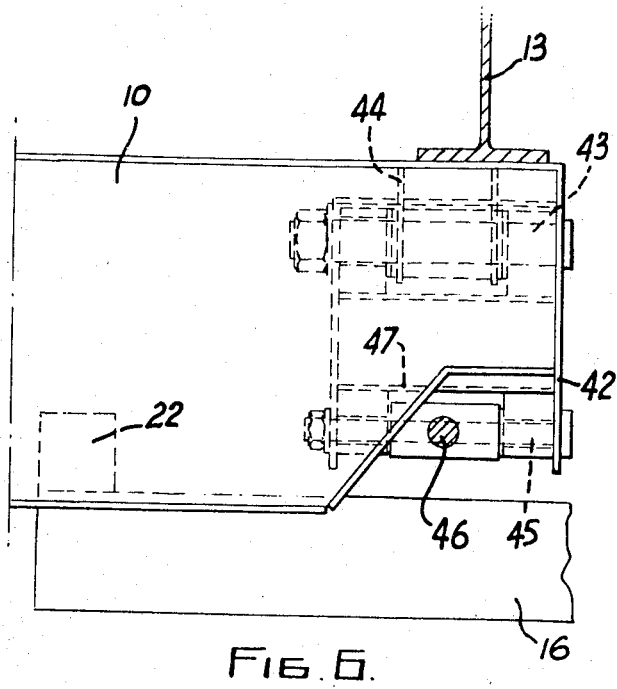

FIGS. 5 and 6 are sections on the lines 5-5 and 6-6, respectively of FIG. 4.

In the example illustrated in FIGS. 1 to 3, the underframe comprises two main or side members 10 of channel section whose flanges are outwardly directed, the webs of such member being connected by wide inverted cross channels 11 at their ends and by a square-section tube 12 at their midpoints. This underframe is intended to be bolted at its corners to the main longitudinals 13 of a trailer chassis, so that its major dimension is at right angles to the centerline of the latter.

Adjacent, and at each side of, the central tubular crossmember 12, the lower flanges of the main underframe channels 10 carry aligned self-lubricating bearings 14 for outwardly projecting pintles 15 fixed at opposite ends of the head 16a of a T-shaped oscillatable arm 16 which is fabricated from square-section tubing.

The outwardly extending shank portion 16b of this arm has fixed therein, beneath the adjacent channel crossmember 11 of the underframe, the squared end of a stub axle 17 carrying a hub 18 for twin road wheels 19 and is braced by inwardly facing channels 20 which extend from its free end to opposite ends of the head 16a.

The resultant triangular "wish bone" is reinforced at its corners by gusset plates 21 of which two carry the mountings 22 of the pintles 15, whilst the third is provided with locating means 23 for a heavy helical coil spring 24 whose upper end seats within the underframe channel member 11 directly above.

The same channel member 11 is provided, centrally of the spring seating 25, with a resilient anchorage 26 for a telescopic hydraulic damper 27, the latter passing through a clearance hole 28 in the top of the square section tube 16b to which the stub axle 17 is fixed, and having its lower end resiliently anchored at 29 to the underside of such tube.

The wheel hub 18 carries a brakedrum 30 cooperating with shoes (not shown) pivotally mounted upon a backplate 31 which is fixed to the stub axle 17 and operated by a cam (not shown) whose shaft 32 is supported in a bearing 33 on the axle-receiving tube 16b.

An arm 34 fixed to this camshaft 32 has its free end mechanically linked at 35 to a handbrake lever (not shown) and another part thereof is connected at 36 to the piston of a pneumatic actuator 37, whose cylinder is supplied through a hose 38 with air from a reservoir (usually in a towing vehicle) and bracketed at 39 to the tube 16b.

To limit compression of the coil spring 24 under shock loading, each wheel-carrying arm 16 is provided with a pair of bump stops comprising rubber pads 40 mounted upon opposite sides of such arm at its free end and cooperating with pillars 41 dependent from the adjacent underframe channel 11.

To enable heavier loads to be carried, two or more of the suspension units above described may e attached side by side to a trailer chassis as shown in FIGS. 4 to 6, or two or more pairs of the wheel-carrying arms 16 may be pivoted upon a common underframe which is similarly attached.

With several pairs of wheels it is, of course, necessary to compensate for any temporary uneven loading of the wheels 19 at each side of the vehicle during movement of the latter.

FIGS. 4 to 6 illustrate a tandem system in which such compensation is effected by mechanical means, the upper ends of the two coil springs 24 at each side of the vehicle being seated, not at fixed positions, but upon the shorter oppositely directed arms of two triangular bellcrank levers 42 which are fulcrummed at 43 to brackets 44 welded to the main chassis longitudinals 13 and underframe crossmembers 10, for movement about parallel axes at right angles to the trailers' centerline.

These levers 42 are of channel section to accommodate the upper parts of the springs 24 and their seatings $25^1$, the shorter arms of both levers carrying swivel pins 45 which are connected by an adjustable tiebar 46.

The bearings for the fulcrum and swivel pins 43, 45 of each lever 42 are welded to the sides of such lever and also to a box section bracing member 47, a bump stop $40^1$ being mounted at the lever's longer arm to cooperate with the underside of the adjacent chassis longitudinal 13.

In the case of a vehicle having three heels 19 per side the coil springs 24 associated with the middle wheel may act upon a shoe pivoted to the inner ends of tandem balance-beams, each of which is centrally fulcrummed upon the underframe or chassis and is provided at its outer end with a pivoted shoe providing a seating for the coil spring 24 of the front or rear wheel as the case may be.

Alternatively the compensation may be effected by means of fluid pressure; for example, hydraulic pressure.

In such a system as applied to a vehicle having two independently sprung wheels 19 per side, the upper ends of the two coil springs 24 may act against pistons or diaphragms in chambers which are connected by piping so that a vertical thrust on one wheel is balanced by a corresponding but opposite thrust on the other.

To prevent the suspension means at either side of the vehicle being rendered inoperative by simultaneous shock loading of both wheels, the pipeline connecting the two pistons or diaphragms may incorporate an expansion chamber in which is a spring-loaded piston.

I claim:

1. A self-contained suspension system for a trailer vehicle whose front end is adapted for swivellable mounting upon a tractor vehicle, comprising an underframe for attachment to the rear part of said trailer vehicle with its major dimension transverse thereto, two T-shaped arms having their head parts pivoted to said underframe for movement about parallel axes at opposite side of its midpoint, stub axles fixed to the shank parts of said arms to form extensions thereof, road wheels mounted on said stub axles, means for bracing the outer end of each of said arms to opposite ends of its head part, and coil springs interposed between said arm ends and adjacent parts of said underframe so that said wheels are sprung independently one of the other.

2. A trailer vehicle suspension system according to claim 1, wherein each wheel-carrying arm comprises lengths of square-section tubing united at right angles to form the head and shank parts thereof, mutually divergent channel members fixed between opposite sides of the free end of said shank part and to opposite ends of said head part, and gusset plates reinforcing the junctions of said channel members with said tubular members.

3. In a trailer vehicle suspension system according to claim 1, wherein the bracing means for opposite ends of the head part of each wheel-carrying arm are reinforced by gusset plates, outwardly projecting pintles fixed to said gusset plates and bearings provided on opposite sideparts of said underframe for engagement by said pintles.

4. A trailer vehicle suspension system according to claim 1, wherein an hydraulic damper concentric with each coil spring connects the parts of the underframe and adjacent wheel-carrying arm separated by said springs.

5. A trailer vehicle suspension system according to claim 1, wherein brake means for each road wheel are connected to an air-operated actuator mounted in the adjacent arm.

6. A trailer vehicle suspension system according to claim 1, wherein said underframe has two or more pairs of said wheel-carrying arms pivoted thereto and compensation means are arranged between the several arms on each side of the vehicles centerline.

7. In a trailer vehicle, two or more suspension systems according to claim 1 and arranged side by side thereon and compensation means arranged between the several wheel-carrying arms on each side of said vehicles centerline.